US008051086B2

(12) United States Patent
Jeffs et al.

(10) Patent No.: US 8,051,086 B2
(45) Date of Patent: Nov. 1, 2011

(54) ENHANCING CALL CENTER PERFORMANCE

(75) Inventors: Christopher J. Jeffs, Roswell, GA (US); Marsal Gavalda, Sandy Springs, GA (US); Philip Kyle Pledger, John Creek, GA (US); Robert Troy Surdick, Mableton, GA (US)

(73) Assignee: Nexidia Inc., Atlanta, GA (US)

( * ) Notice: Subject to any disclaimer, the term of this patent is extended or adjusted under 35 U.S.C. 154(b) by 295 days.

(21) Appl. No.: 12/490,757

(22) Filed: Jun. 24, 2009

(65) Prior Publication Data

US 2010/0332477 A1    Dec. 30, 2010

(51) Int. Cl.
*G06F 17/30* (2006.01)
*G06F 7/00* (2006.01)

(52) U.S. Cl. ......... 707/738; 707/725; 707/769; 707/916
(58) Field of Classification Search ........................ None
See application file for complete search history.

(56) References Cited

U.S. PATENT DOCUMENTS

| | | | |
|---|---|---|---|
| 5,950,159 A * | 9/1999 | Knill | 704/251 |
| 6,006,185 A * | 12/1999 | Immarco | 704/251 |
| 7,487,094 B1 * | 2/2009 | Konig et al. | 704/270 |
| 2003/0154072 A1 * | 8/2003 | Young et al. | 704/9 |
| 2004/0006470 A1 * | 1/2004 | Kobayashi | 704/255 |
| 2005/0216421 A1 * | 9/2005 | Barry et al. | 705/64 |
| 2006/0198504 A1 * | 9/2006 | Shemisa et al. | 379/201.02 |
| 2007/0198284 A1 * | 8/2007 | Korenblit et al. | 705/1 |
| 2008/0154579 A1 * | 6/2008 | Kummamuru | 704/9 |
| 2008/0228296 A1 * | 9/2008 | Eilam et al. | 700/94 |
| 2011/0019805 A1 * | 1/2011 | Zoehner | 379/90.01 |

* cited by examiner

*Primary Examiner* — Greta Robinson
*Assistant Examiner* — James J Wilcox
(74) *Attorney, Agent, or Firm* — Occhiuti Rohlicek & Tsao LLP

(57) ABSTRACT

Some general aspects of the invention relate to systems and methods of processing data, for example, to improve customer interactions. One aspect, in particular, relates to a computer-implemented method that includes accepting user input for analysis of a database having media data and metadata. The media data includes a group of audio recordings and the metadata includes descriptive information of the group of audio recordings. A representation of a set of call series is formed based on user input, and processed to generate an analysis report. A visual representation of the analysis report is formed for presentation to a user.

16 Claims, 10 Drawing Sheets

"Top Caller" Report

| Customer ID ▶ | Calls ▶ | Topics |
|---|---|---|
| 98798732 | 63 | Billing, Password Reset, Late Fees |
| 8721983798 | 23 | Password Reset, Late Fees |
| 979213 | 12 | Late Fees |
| 97213987 | 10 | Late Fees |
| 912398912 | 9 | etc |
| 987002958 | 8 | etc |
| 7342057 | 3 | etc |
| 9344952 | 3 | etc |
| 823945 | 3 | etc |

*FIG. 9*

ENHANCING CALL CENTER PERFORMANCE

BACKGROUND

This application relates to systems and methods for enhancing call center performance.

Customer relationship management allows a company to monitor and investigate its interactions with both current and prospective customers in order to drive more successful business processes. In a call center context, the degree of overall customer satisfaction can be indicated by metrics such as call volume, average call length, average wait time, call abandon rate, and follow-up call frequency.

SUMMARY

Some general aspects of the invention relate to systems and methods of processing data, for example, to improve customer interactions. One aspect, in particular, relates to a computer-implemented method that includes accepting user input for analysis of a database having media data and metadata. The media data includes a group of audio recordings and the metadata includes descriptive information of the group of audio recordings.

A representation of a set of call series is formed based on user input. More specifically, one or more repeat callers are identified according to the metadata, a result of content-based analysis of the media data, or a combination of both. For each repeat caller, a sequence of audio recordings associated with the repeat caller is identified. The identified sequences of audio recordings are processed to find one or more call series, with each call series including at least a subsequence of an identified sequence of audio recordings that satisfies one or more user-defined criteria.

The representation of the set of call series is processed to generate an analysis report, and a visual representation of the analysis report is formed for presentation to a user.

Embodiments may include one or more of the following features.

The content-based analysis of the media data includes searching in the plurality of audio recordings for content associated with one or more queries, or with a predetermined combination of queries.

The metadata includes a searchable representation of the media data. The searchable representation of the media data may include an at least partially textual representation of the media data (e.g., transcripts, agent notes, and other types of descriptive information), or a searchable phonetic representation of the media data.

In examples where the metadata includes a search phonetic representation of the media data, the content-based analysis of the media data includes applying a phonetically based word-spotting technique to search for occurrences of one or more queries in the searchable phonetic representation of the media data.

In some embodiments, processing the representation of the set of call series to generate an analysis report includes determining a set of one or more common topics among repeat callers. For example, common topics may be determined by conducting a set of one or more structured queries on a phonetic or textual representation of the media data. Examples of structured queries include phrases, Boolean operators, time-based operators, and a combination thereof.

In some other embodiments, processing the representation of the set of call series to generate an analysis report includes determining a degree of correlation of the content of a first audio recording in each identified call series with the content of subsequent audio recordings in the identified call series. The degree of correlation can be determined, for example, by determining, for each audio recording in the set of identified call series, whether the recording is associated with at least one of a predetermined set of content categories, and subsequently be represented using a correlation metric.

The correlation metric can be computed in a number of ways. One example is to compute, within a subset of call series whose first audio recording is associated with a first content category, the ratio of call series each having at least one audio recording associated with the second content category. A second example is to compute, within a subset of call series whose first audio recording is associated with a first content category, the ratio of call series each having at least one non-first audio recording associated with the second content category. A third example is to compute, within a subset of call series each of which has at least one audio recording being associated with a first content category, the ratio of call series each having at least one audio recording associated with the second content category. A fourth example is to compute, within a subset of call series each of which has at least one audio recording being associated with a first content category, the ratio of call series each having at least one non-first audio recording associated with the second content category. Other examples include determining a linear or non-linear combination of call counts associated with a first and a second content category.

The user-defined criterion includes one or more of the following: a minimum number of calls within a call series, a minimum amount of time allowed between consecutive calls in a call series, a maximum amount of time allowed between consecutive calls in a series, a total duration of a call series, talk-time characteristics and/or non-talk time characteristics in a call series, and an occurrence of a search term.

Other features and advantages of the invention are apparent from the following description, and from the claims.

BRIEF DESCRIPTION OF DRAWINGS

FIG. 2 shows an exemplary user interface for defining Call Series.

FIG. 5 shows an exemplary "forensic search" report.

FIG. 9 shows an exemplary "top callers" report.

DETAILED DESCRIPTION

1 Overview

The following description discusses various techniques and approaches that can be applied for improving customer relations. For purposes of illustration and without limitation, some of the techniques are illustrated in detail below in the context of customer interactions with call centers. One particular aspect relates to first call resolution (FCR), which seeks to properly address customers' concerns the first time they call and thus reduce their need to call again. In many situations, callers who have received inadequate answers and encountered incomplete processes tend to place repeat calls, which can drive up call volume and operational costs, negatively impact customer experience, increase customer attrition, and result in lost revenue. Thus, analytic tools that assist management in investigating the causes and patterns of call repetitions and chronic callers can add significant business values to call centers.

Figure 1:
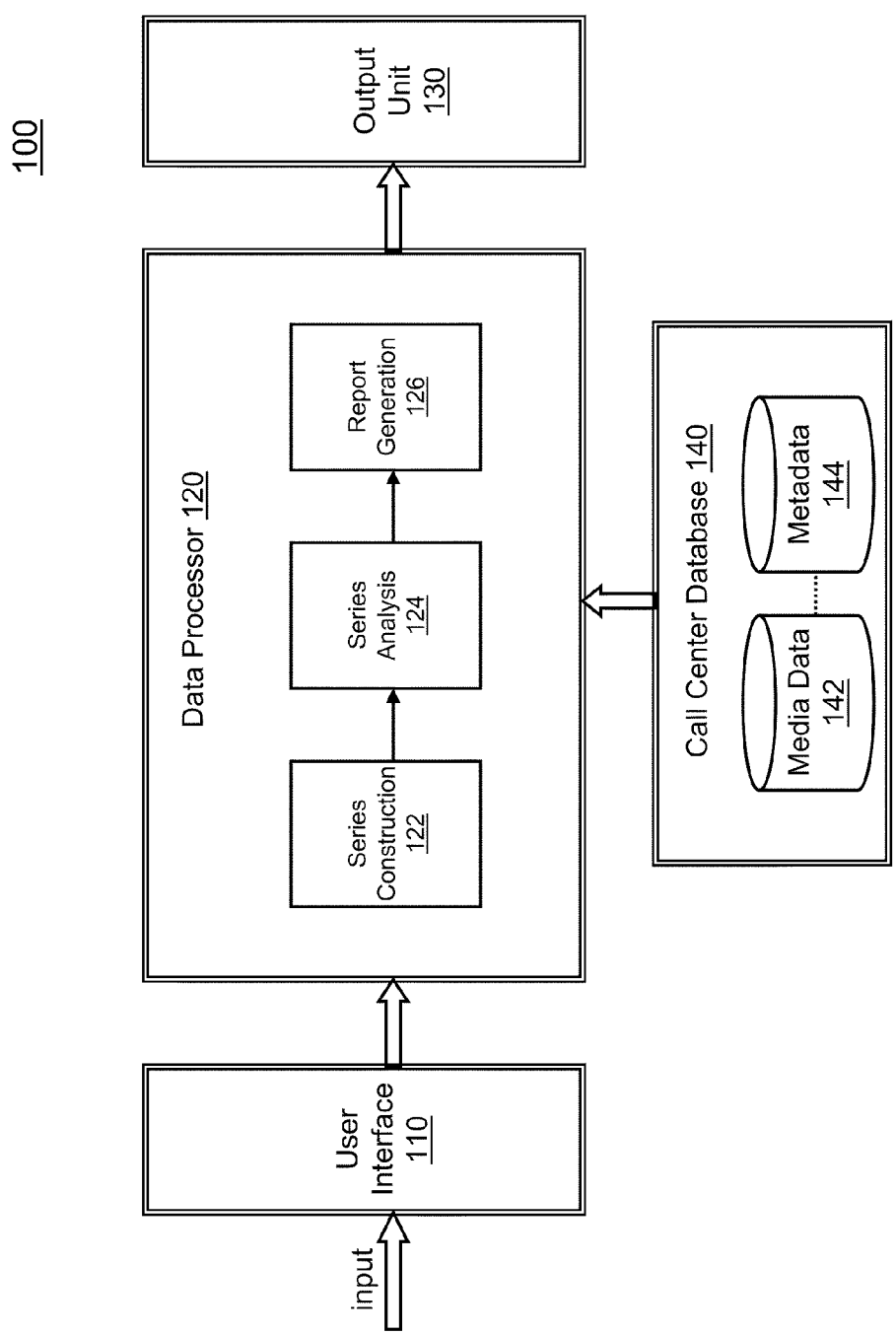
FIG. 1 shows a block diagram of one embodiment of a data management system.

FIG. 1 shows one embodiment of a data management system 100 that includes a data processor 120 for performing various types of user-directed analyses relating to first call resolution. Very generally, the data management system 100 includes a user interface 110 for accepting input from a user (e.g., an agent, a supervisor, or a manager) to define the scope of data to be investigated and the rules by which the investigation will be conducted. The input is provided to the data processor 120, which subsequently accesses a call center database 140 to obtain and analyze selected segments of data according to the user-defined rules.

Generally, the database 140 includes media data 142, for example, voice recordings of past and present calls handled by agents. The database 140 also includes metadata 144, which contains descriptive, non-audio data stored in association with audio data 142. Examples of metadata 144 include phonetic audio track (PAT) files that provide a searchable phonetic representation of the media data, transcripts of the media data, and descriptive information such as customer identifiers, agent identifiers, call durations, transfer records, day and time of a call, general categorization of calls (e.g., payment vs. technical support), and agent notes.

By processing data maintained in the call center database 140, the data processor 120 can extract management-relevant information for use in a wide range of analyses, including for example:
- monitoring key metrics indicative of customer satisfaction/dissatisfaction;
- identifying anomalies that require investigation;
- identifying trends;
- correlating results to support root cause analysis;
- gaining insights on the performance of individual agents and groups of agents; and
- accessing user information using tool-tips and drill down to specific media files.

Results of these analyses can be presented to the user in desired forms through an output unit 130 (e.g. on a computer screen), allowing user interactions through the user interface 110 for further analysis and processing of the data if needed.

In some embodiments, to provide first call resolution functionality, the data processor 120 implements a set of processing actions to help users pinpoint the issues and circumstances that drive repeat calls. Those actions include repeat series construction 122, series analysis 124, and report generation 126, as described in detail below.

2 Series Construction

Initially, the data processor 120 constructs a set of one or more Call Series according to user-defined rules on what constitutes a Call Series. Very generally, a Call Series includes a sequence of calls having attributes that satisfy certain criteria, for example, a sequence of at least three calls initiated by the same customer within a week's period. Note that depending on the particular application, a Call Series can be defined using a set of one or more dynamically adjustable parameters in a manner that reflects the specific objective of data analysis and user preferences. Analytics of the set of Call Series are performed based on metadata 144 together with the voice content of media data 142. The following section discusses some examples of the parameters suitable for constructing Call Series.

Figure 2:
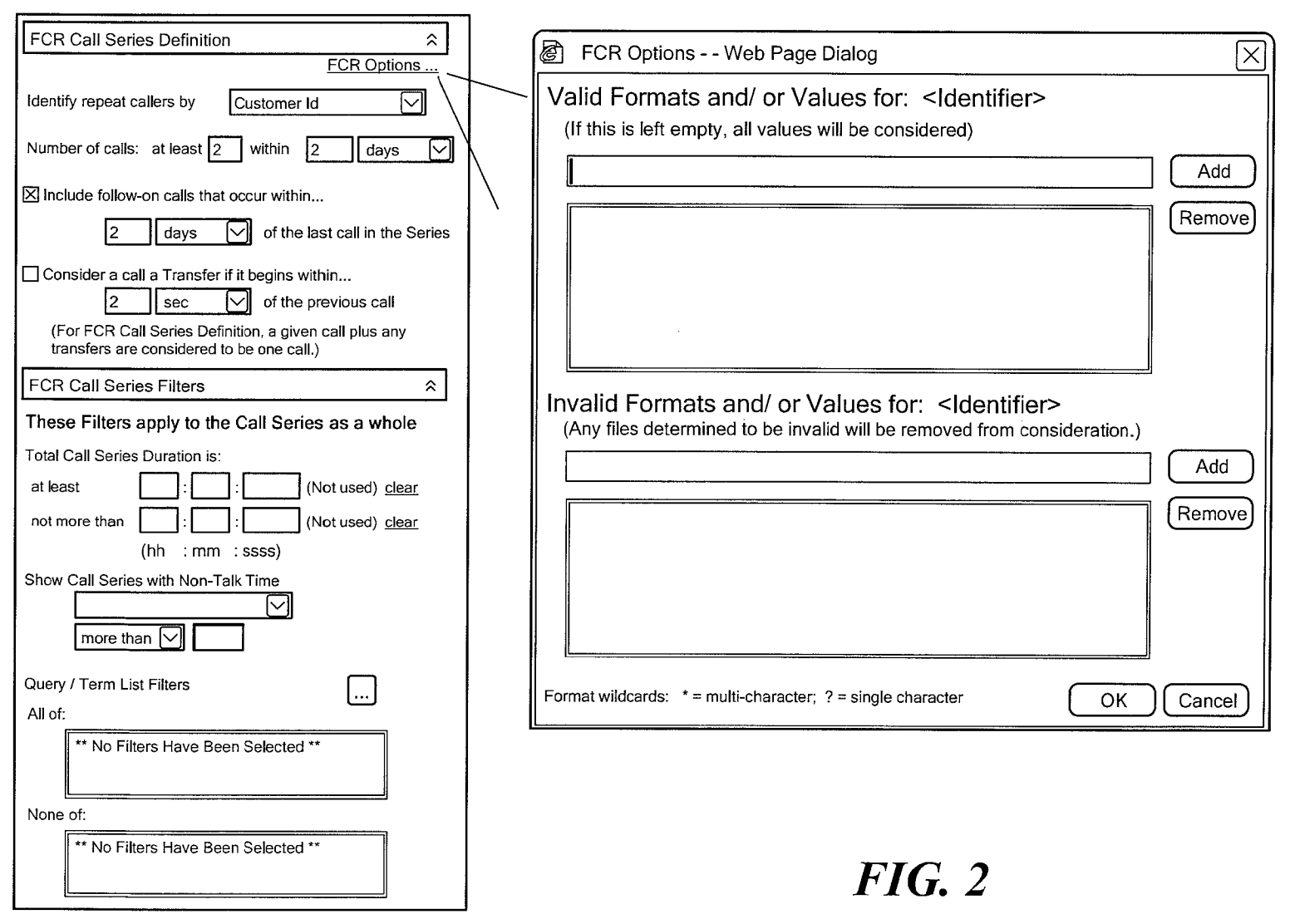

FIG. 2 shows an input interface through which a user selectively enters the values of various parameters to construct a Call Series. Here, the first primary parameter relates to identification of repeat callers, which generally refers to callers who have initiated more than one call with the call center. Repeat callers can be identified, for example, by customer ID, automatic number identification (ANI), caller ID, or via other means. Compared with some conventional techniques that rely solely on anecdotal information or manual call listening to find repeat callers, the data processor 120 provides a mechanism that combines the use of metadata 144 with spoken content to identify repeat callers. For example, some repeat callers can be found by searching in metadata 144 for customer IDs (or names) that are associated with multiple media files or by searching for customer IDs that are indicated in agent notes as repeat callers. In some other examples, repeat callers can be identified through analyzing voice content, for example, by using phonetically based word-spotting techniques to seek words/lines in a call that indicate the existence of a previous, relevant call. Examples of such words/lines include "this is the second/third time I have called," "the last person I spoke with," "when I called last week/month," and "the service tech never showed up." Calls identified through voice content can also be analyzed and correlated to other call categories to gain directional insights into repeat call drivers.

Once repeat callers are identified, a sequence of calls (including both original and repeat calls) initiated by each one of those callers can be conveniently determined based on metadata 144. These sequences can serve as the base scope of data within which user-defined Call Series are located.

For example, given the sequences of calls from repeat callers, a second primary parameter for defining a Call Series relates to the minimum number of calls required for a sequence of calls to be considered a Call Series. For example, the user may specify that only sequences containing at least two calls within a two-day period may qualify as a Call Series. If a user placed a sequence of four calls respectively at day 1, day 4, day 5, and day 7, then according to this rule, only the subsequence of the two calls that occurred at day 4 and day 5 may be considered a Call Series.

A third primary parameter relates to the time allowed between consecutive calls in a sequence. One example is the maximum amount of time (days, hours, minutes) allowed between consecutive calls in a Call Series. This can help rule out, for example, possibly unrelated calls initiated by the same customer such as two calls that occurred six months apart. Another example is the minimum amount of time (e.g., hours, minutes, seconds) that must be exceeded between consecutive calls in a Call Series. This can help filter out call transfers from the Call Series. For example, if transferred calls are saved as separate media files by the recorder, they may appear as a Call Series (two calls, the second beginning seconds after the first one ended) even though they are really the same call. Using the minimum-time requirement, a transfer call can be treated as one call for the purposes of defining a Call Series.

In some examples, Call Series are defined solely based on these three primary parameters. In some other examples, other parameters can also be used to allow the user to adjust the types of calls to be included in the analysis. These optional parameters can include, for example:

The duration of the total length of a Call Series. For example, if the user sets the duration greater than or equal to 20 minutes, then the data processor 120 will return all Call Series that satisfies this requirement.

Non-talk time. This allows the user to filter call series based on the amount of time that no speech is detected within a Call Series. For example, if the total non-talk time within a Call Series meets the Non-Talk time criteria, then the Call Series is included in the analysis. This non-talk time can be defined based on, for example, total duration of non-talk time, percentage of non-talk time, and the number of occurrences.

Query/Search Terms. This allows the user to filter call series based on whether a Call Series must or must not contain calls with hits for selected queries (which can be one or multiple queries). For example, a user selects three queries that a Call Series need to satisfy. If any call within a sequence contains hits for all three queries, then this sequence is considered a Call Series. Or if multiple calls in the sequence satisfy different queries, but the three-query criterion is met in the sequence taken as a whole, then the sequence is also considered a Call Series.

The above mentioned parameters can be set based on input through the user interface 110, or absent user input, be set as default. For example, the system can accept search terms created by the user and then process the voice recordings in media data 142 (or alternatively process the corresponding PAT files in the metadata 144) to identify media files that have hits for the entered search terms. In some other examples, the system can provide a predefined list of search terms for user selection, in addition to or alternative to accepting search terms created by the user. The predefined search terms may be determined, for example, based on metadata (e.g., using the general categorization of calls) or knowledge (e.g., based on a set of hot areas of user concerns).

3 Series Analysis and Report Generation

Depending on the particular implementation, the data processor 120 performs various types of insight-driven analyses on the identified Call Series to address questions such as:

What are the topics among repeat callers?
What are the broken processes that are driving repeat calls?
What specific agents are exhibiting behavior driving repeat calls?
Are there calling cycles that can provide insight into behaviors?
Who are the most frequent callers and why?

Some of these analyses are discussed below.

3.1 Topic Analysis

Topic analysis allows the user to gain directional insight into what topics are most commonly discussed among population of repeat callers.

Figure 3:
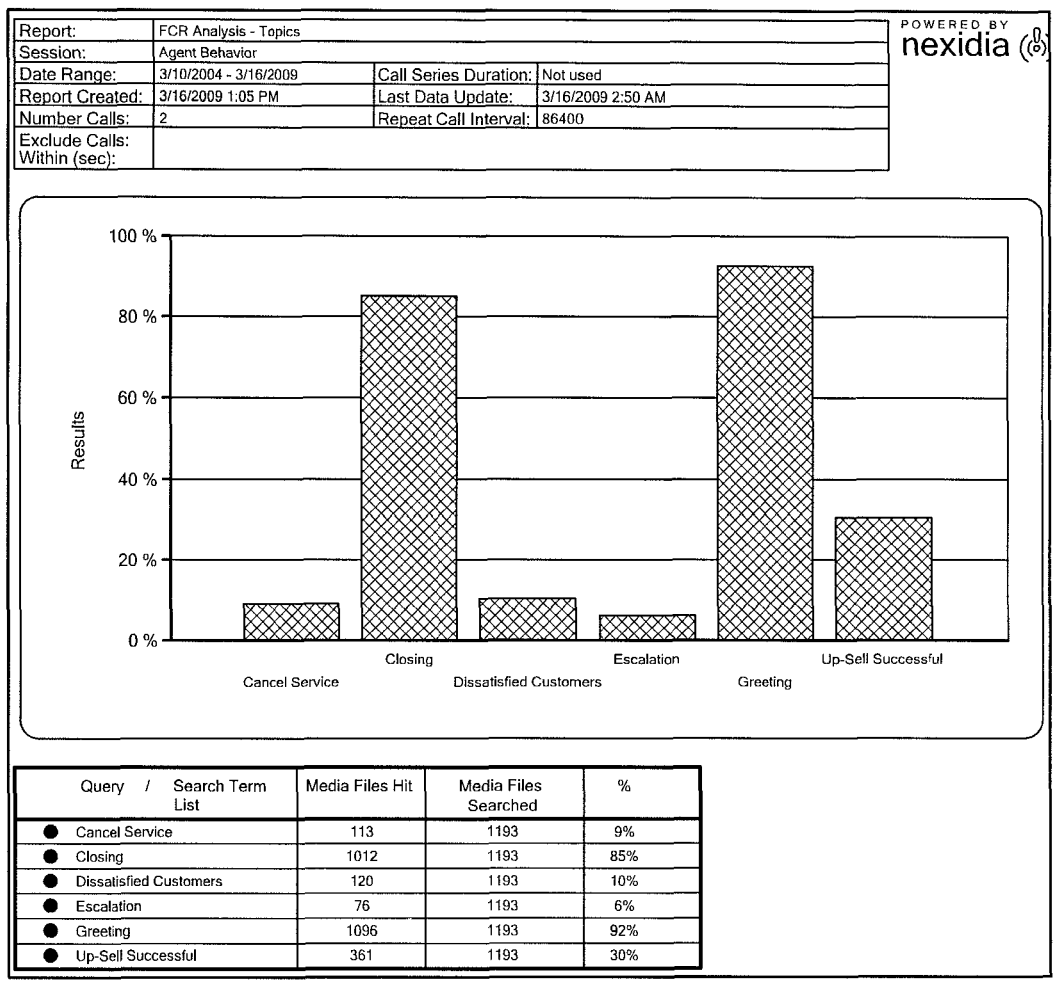
FIG. 3 shows an exemplary "topics" report.

FIG. 3 shows one example of a topic analysis report generated by the data processor 120.

In the chart of FIG. 3, the x-axis represents the names of the queries that produced the hits. Each bar on the chart represents a query. The y-axis represents the percentage of media files out of the total files searched that produced at least one hit for the associated query. In this example, "Greeting" has the most hits among other queries, indicating that this is the most common topic among interactions from customers making multiple calls. Note the chart can be generated with a set of display options, such as to show talk time and non-talk time as an overlay in the chart, to select orientation of the report chart (column chart vs. bar chart), and to sort order alphabetically or based on the values of parameters.

In the table of FIG. 3, each query is shown with the number of media files that produced the query, the number of total media files included in the search, and the percentage of files that generated the hits.

3.2 Relationship Analysis

Relationship analysis allows the user to identify the cause-effect relationships to determine topic on the initial calls that are driving subsequent calls, possible of a different nature. For example, the data processor 120 can identify, based on the reason for the first call, the most common topics in subsequent calls.

Figure 4:
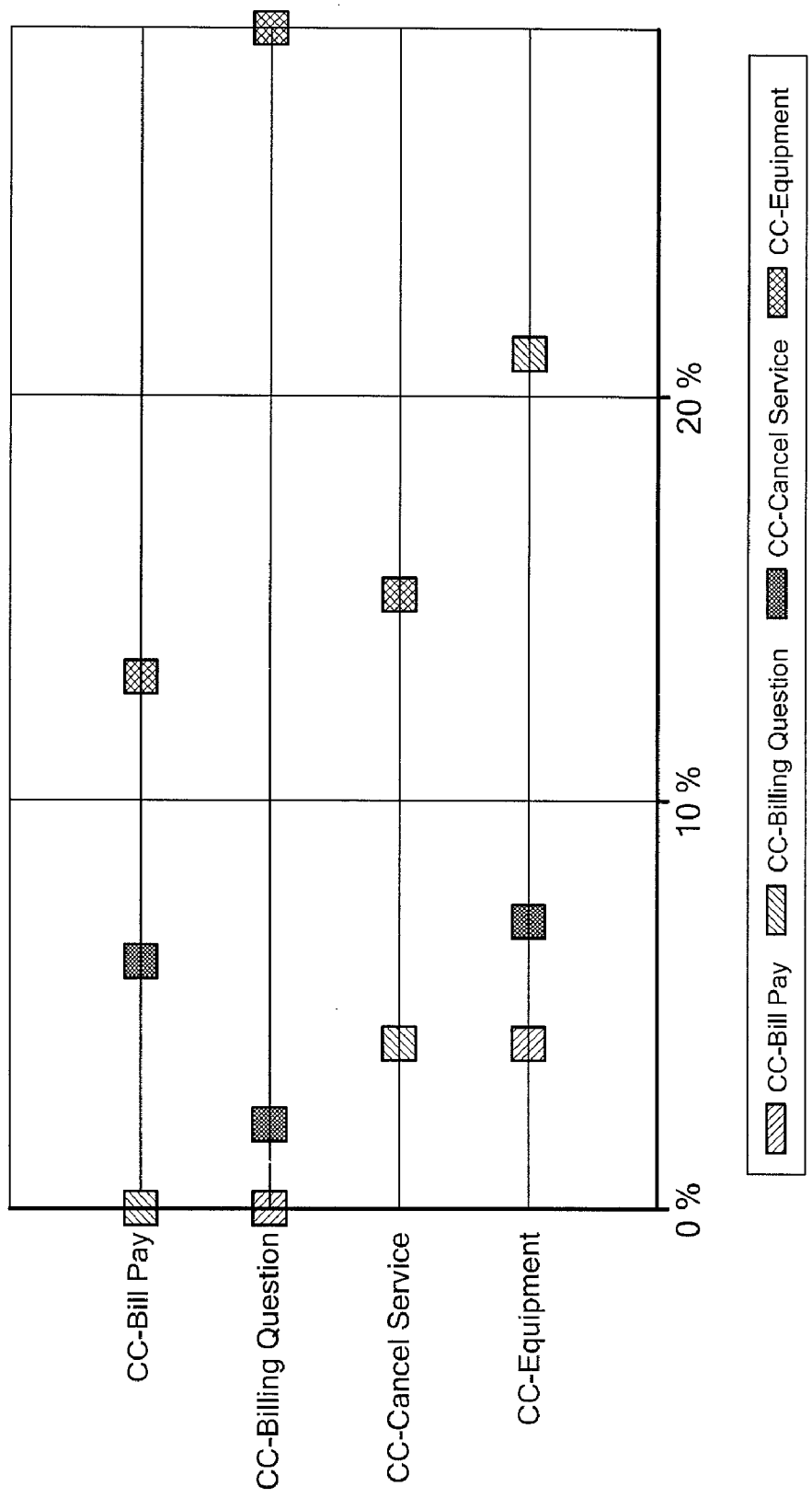
FIG. 4 shows an exemplary "relationship" report.

FIG. 4 shows one example of a relationship analysis report.

In the chart of FIG. 4, the x-axis displays the percentage of calls or Call Series (depending on the settings) generating a hit for one query in the Call Series that also generated a hit for the correlated query in the first call of the Call Series. Each query is assigned a color, as identified in the key below the chart. For example, say that query B is assigned the color blue, and a blue block appears at the 40% mark for query A. This means that 40% of the files that matched query A also generated a hit for query B. The y-axis displays the query that triggered the first call in a Call Series. In this example, initial calls relating to "CC-Billing Question" are shown to have a strong correlation with calls relating to "CC-Equipment," as 30% of the call series matching "CC-Billing Question" in the first call of the series also matches "CC-Equipment."

3.3 Forensic Search

Forensic search enables the user to listen to and investigate all calls within a Call Series. This functionality includes various forensic search capabilities around data filtering and ad-hoc searches, for example, using phonetically-based word-spotting techniques. Further discussions of forensic search are provided in the attached Appendix.

Figure 5:
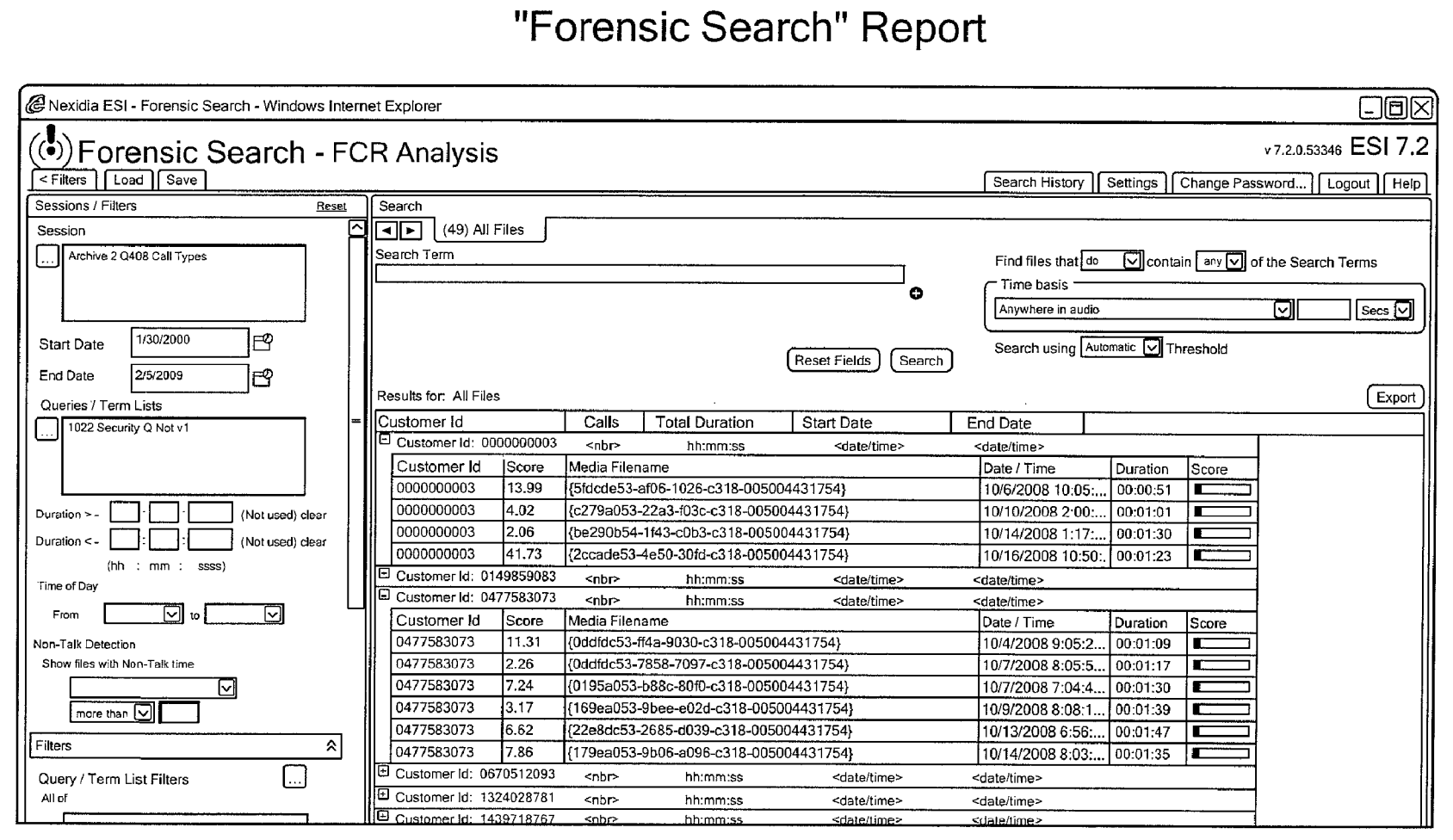

FIG. 5 shows one example of a forensic search report.

3.4 History Analysis

History analysis allows the user to drill down into sample interaction history to review details of the interactions, for example, based on previously aggregated reports. For example, a user can review call patterns among top-n repeat callers. This can help the user in visualizing call histories, patterns, and associated call drivers.

Figure 6:
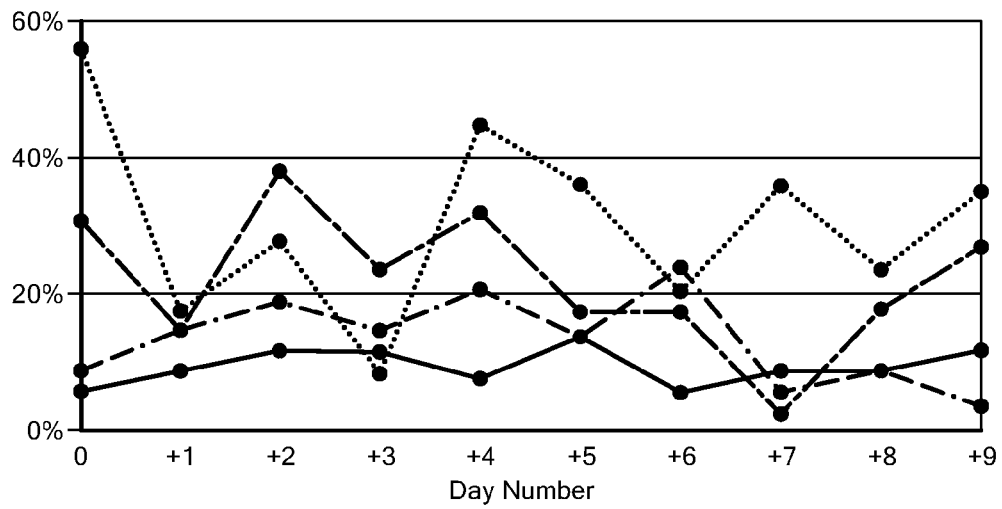
FIG. 6 shows an exemplary "history" report.

FIG. 6 shows one example of a history report.

3.5 Calling Patterns

Calling patterns analysis identifies cyclical patterns among repeat callers to help understand customer or agent behaviors associated with those calls. In one example, reports are generated to show, since the day of the initial call, patterns around subsequent calls. Customer behaviors can be identified to show, for example, whether they were trying to get a different answer, they were told to call back in a certain number of days to verify, or there were remaining issues to be resolved upon next statement. Also, call pattern analysis can be helpful in discovering call back rates based on initial caller intent.

Figure 7:
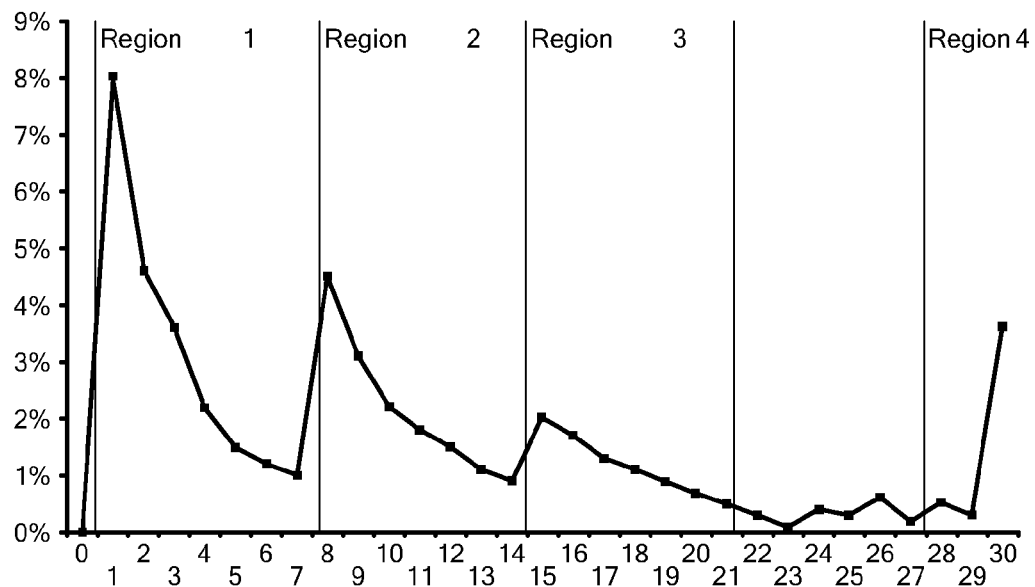
FIG. 7 shows an exemplary "calling patterns" report.

FIG. 7 shows one example of a calling patterns report.

3.6 Agent Behaviors

Agent behaviors analysis can help identify agents, sites, or teams that drive repeat calls as well as topics associated with those calls. Based on the agent handling the initial call, the volume of subsequent calls and the topics can be determined.

Figure 8:
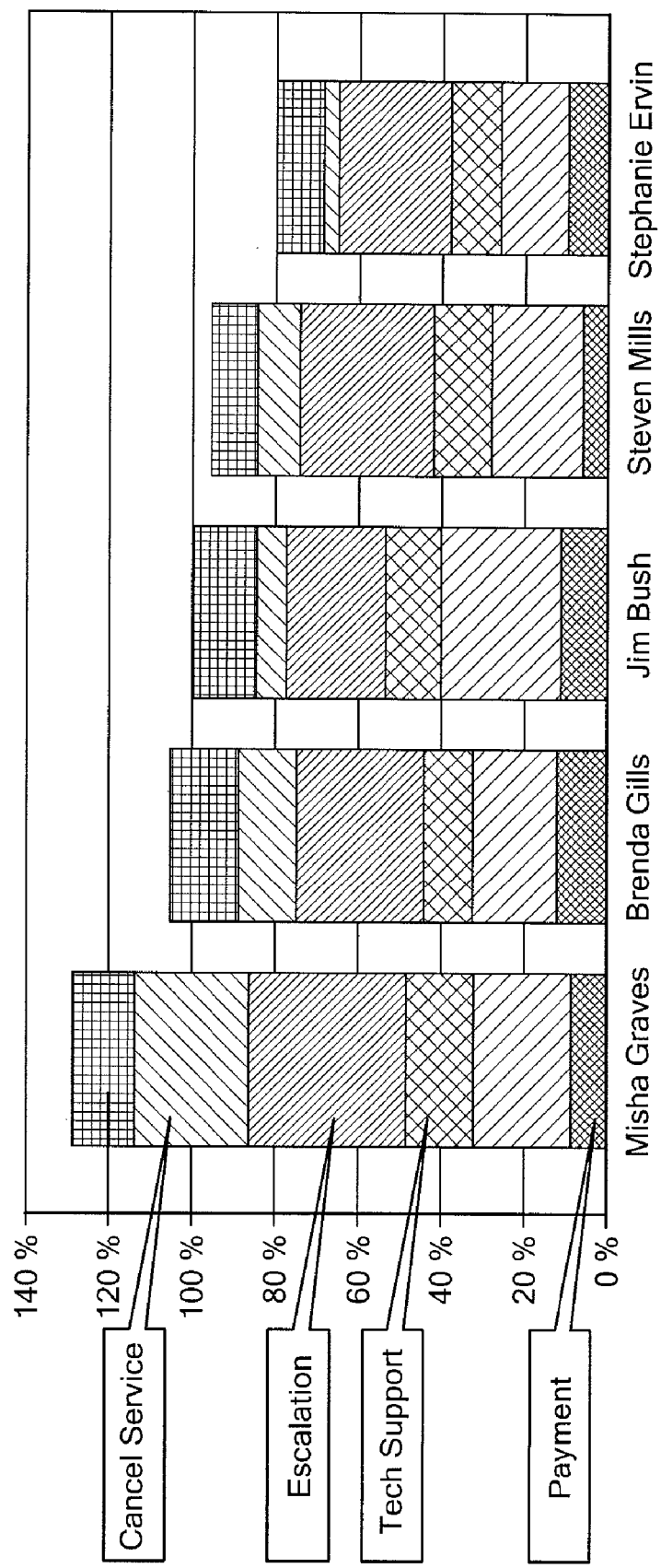
FIG. 8 shows an exemplary "behaviors" report.

FIG. 8 shows one example of an agent behaviors report. In this example, each bar in the chart represents customer calls that are follow-ups to calls initially handled by a particular agent, and the height of a bar corresponds to the volume of those follow-up calls. Here, agent "Misha Graves" is found to be driving the highest number of follow-up calls compared with other agents in this chart. To determine whether this high rate of call repetition is a result of agent incompetence or rather is due to the particular areas of calls to which agent Misha is assigned, the bulk of follow-up calls can be further analyzed by topics, with each topic shown as a bar segment of a corresponding color. In this example, of those follow-ups driven by agent Misha, higher percentages were related to "Escalation" and "Cancel Service," as compared with other topics such as "Payment" and "Tech Support." This result indicates a high level of dissatisfaction among customers whose initial calls were handled by agent Misha, and can thus prompt the management to take subsequent actions, for example, to investigate her call records and determine whether there is a need for agent training or dismissal.

3.7 Top Callers

Top callers analysis can help identify top callers and gain insight into their needs and associated customer/agent behaviors.

FIG. 9 shows one example of a top callers report.

Note that some of the above reports can be displayed in conjunction with other reports to provide the user with an extended array of information and enable the user to drill down to calls within forensic search.

Figure 10:
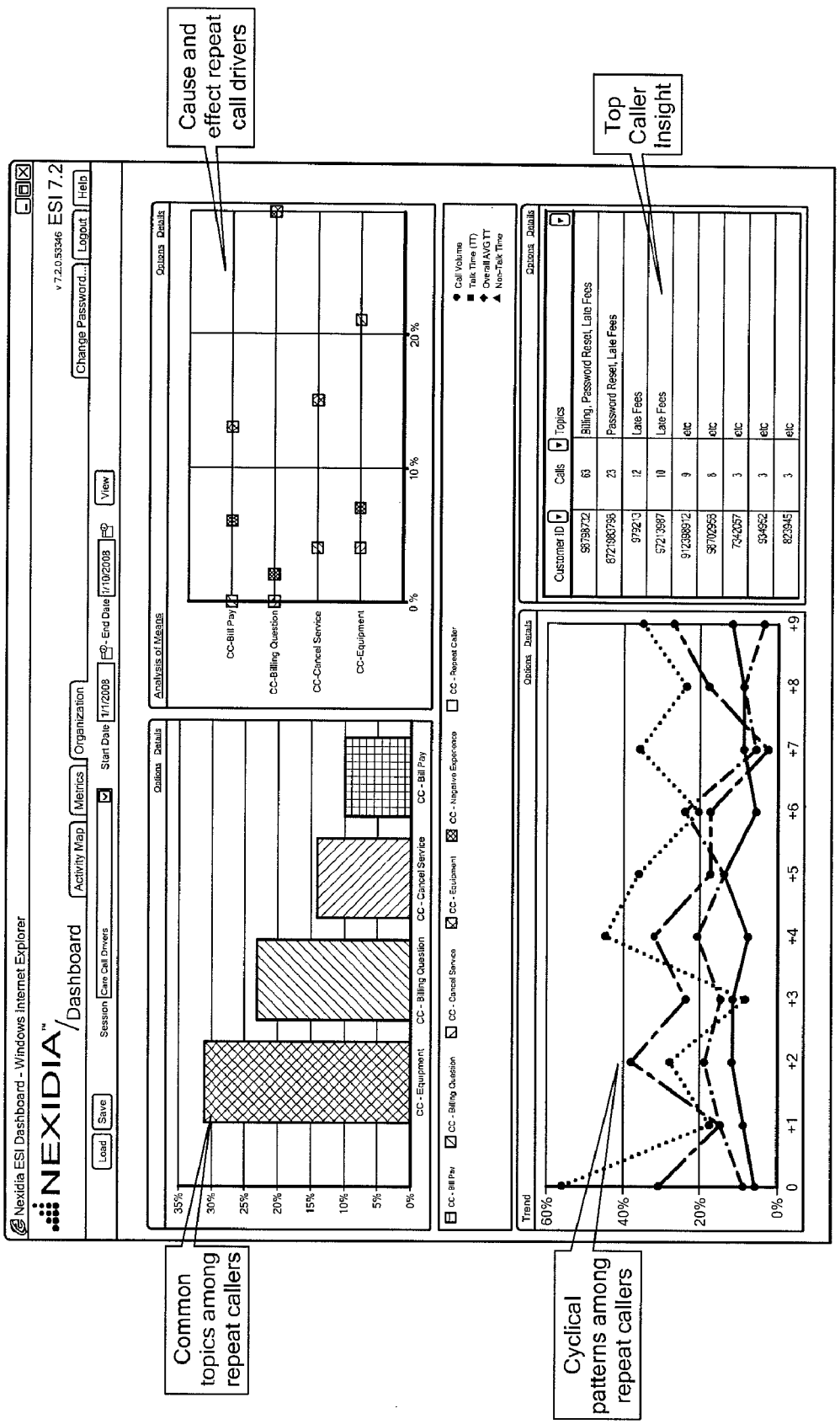
FIG. 10 shows a dashboard that displays multiple reports in one view.

FIG. 10 shows one example of a dashboard that shows four different types of reports within one view.

4 Applications

The above-discussed FCR techniques are generally applicable to a number of call center implementations in which various types of hardware and network architectures may be used.

Figure 11:
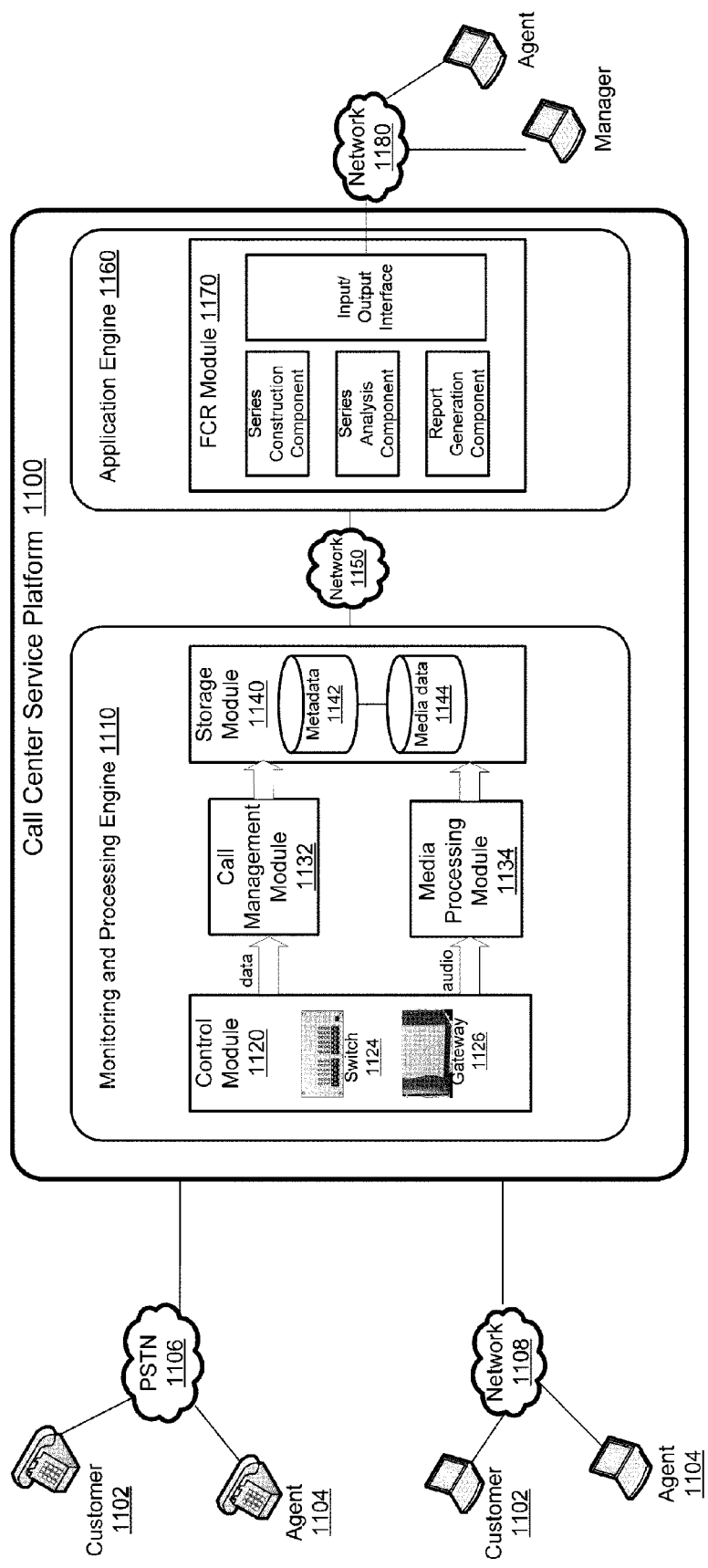
FIG. 11 shows an exemplary call center service platform on which first call resolution (FCR) functionality can be implemented.

FIG. 11 shows one embodiment of a call center service platform 1100 that integrates FCR functionality with other forms of customer interactions management. Here, the call center service platform 1100 implements at least two types of service engines. A monitoring and processing engine 1110 is configured for connecting customers and agents (for example, through voice calls), monitoring and managing interactions between those two parties, and extracting useful data from past and present interactions. Based on the extracted data, an application engine 1160 is configured for performing user-directed analyses (such as FCR analysis) to assist management in obtaining business insights.

Traditionally, a customer 1102 contacts a call center by placing telephone calls through a telecommunication network, for example, via the public switched telephone network (PSTN) 1106. In some implementations, the customer 1102 may also contact the call center by initiating data-based communications through a data network 1108, for example, via internet by using voice over internet protocol (VoIP) technology.

Upon receiving an incoming request, a control module 1120 in the monitoring and processing engine 1110 uses a switch 1124 to route the customer call to a call center agent 1104. Once call connections are established, a media gateway 1126 is used to convert voice streams transmitted from the PSTN 1106 or from the data network 1108 into a suitable form of media data compatible for use by a media processing module 1134.

In many situations, the media processing module 1134 records voice calls received from the media gateway 1126 and stores them as media data 1144 into a storage module 1140. Some implementations of the media processing module are further configured to process the media data to generate non-audio based representations of the media files, such as phonetic audio track (PAT) files that provide a searchable phonetic representation of the media files, base on which the content of the media can be conveniently searched. Those non-audio based representations are stored as metadata 1142 in the storage module 1140.

The monitoring and processing engine 1110 also includes a call manage module 1132 that obtains descriptive information about each voice call based on data supplied by the control module 1120. Examples of such information includes caller identifier (e.g., phone number, IP address, customer number), agent identifiers, call duration, transfer records, day and time of the call, and general categorization of calls (e.g., as determined based on touchtone input), all of which can be saved as metadata 1142 in the storage module 1140.

Data in the storage module 1140 can be accessed by the application engine 1160 over a data network 1150. Depending on the particular implementation, the application engine 1160 may employ a set of functional modules, each configured for a different analytic task. For example, the application engine 1160 may include a FCR module 1170 that provides first call resolution functionality in a manner similar to the data management system 100 described above with reference to FIG. 1. Call center agents and managers can interact with the FCR module 1170 to provide input and obtain analysis reports through a data network 1180, which may or may not be the same as the data network 1150 coupling the two service engines 1110 and 1160.

Note that this embodiment of call center service platform 1100 offers an integration of telecommunication-based and data-based networks to enable user interactions in different forms, including voice, Web communication, text messaging, and email. Examples of telecommunication networks include both fixed and mobile telecommunication networks. Examples of data networks include local area networks ("LAN") and wide area network ("WAN"), e.g., the Internet, and include both wired and wireless networks.

Also, customers and agents who interact on the same call center service platform 1100 do not necessarily have to reside within the same physical or geographical region. For example, a customer located in U.S. may be connected to an agent who works at an outsourced call center in India.

In some examples, each of the two service engines 1110 and 1160 may reside on a separate server and individually operate in a centralized manner. In some other examples, the functional modules of a service engine may be distributed onto multiple hardware components, between which data communication channels are provided. Although in the example of FIG. 11, the two service engines are illustrated as two separate engines that communicate over the network 1150, in certain implementations, they may be integrated into one service engine that operates without the use of data network 1150.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. In a system in electronic communication with a database having media data, the media data including audio recordings of calls and metadata associated with the calls, a computer-implemented method comprising:
    accepting user input specifying a set of criteria that define a call series indicative of a plurality of content-related audio recordings, the set of criteria including a minimum number of calls sharing a common caller identifier within a defined time interval;
    forming a representation of a set of one or more call series based on the user input, including identifying as a call series each of one or more pluralities of content-related audio recordings that satisfies the set of criteria;
    processing the representation of the set of one or more call series to generate an analysis report; and
    performing a content-based analysis of the media data that includes applying a phonetically based word-spotting technique to search for occurrences of one or more queries in the metadata, the metadata including a searchable phonetic representation of the media data.

2. The computer-implemented method of claim 1, wherein forming the representation of the set of one or more call series includes performing a content-based analysis of the media data that includes searching the audio recordings for content associated with one or more queries, or with a predetermined combination of queries.

3. The computer-implemented method of claim 1, wherein the searchable representation of the media data includes an at least partially textual representation of the media data.

4. The computer-implemented method of claim 1, wherein processing the representation of the set of one or more call series to generate an analysis report includes:
    determining a set of one or more common topics among the set of one or more call series.

5. The computer-implemented method of claim 4, wherein determining the set of one or more common topics includes:
    applying a set of one or more structured queries on a phonetic or textual representation of the media data.

6. The computer-implemented method of claim 5, wherein the structured queries include phrases, Boolean operators, time-based operators, or a combination thereof.

7. The computer-implemented method of claim 1, wherein processing the representation of the set of one or more call series to generate an analysis report includes:
    determining a degree of correlation of the content of a first audio recording in each identified call series with the content of subsequent audio recordings in the identified call series.

8. The computer-implemented method of claim 7, wherein determining the degree of correlation includes:
    for each audio recording in the set of identified call series, determining whether the recording is associated with at least one of a predetermined set of content categories.

9. The computer-implemented method of claim 8, wherein determining the degree of correlation further includes:
    within a subset of call series whose first audio recording is associated with a first content category, computing the ratio of call series each having at least one audio recording associated with the second content category.

10. The computer-implemented method of claim 8, wherein determining the degree of correlation further includes:
    within a subset of call series whose first audio recording is associated with a first content category, computing the ratio of call series each having at least one non-first audio recording associated with the second content category.

11. The computer-implemented method of claim 8, wherein determining the degree of correlation further includes:
    within a subset of call series each of which has at least one audio recording being associated with a first content category, computing the ratio of call series each having at least one audio recording associated with the second content category.

12. The computer-implemented method of claim 8, wherein determining the degree of correlation further includes:
    within a subset of call series each of which has at least one audio recording being associated with a first content category, computing the ratio of call series each having at least one non-first audio recording associated with the second content category.

13. The computer-implemented method of claim 8, wherein determining the degree of correlation further includes:
    determining a linear or non-linear combination of call counts associated with a first and a second content category.

14. The computer-implemented method of claim 1, wherein the set of criteria includes one or more of the following: a minimum number of calls within a call series, a minimum amount of time allowed between consecutive calls in a call series, a maximum amount of time allowed between consecutive calls in a series, a total duration of a call series, talk-time characteristics and/or non-talk time characteristics in a call series, and an occurrence of a search term.

15. The computer-implemented method of claim 1, further comprising:
    forming a visual representation of the analysis report for presentation to a user.

16. The computer-implemented method of claim 1, wherein the caller identifier includes a customer ID value, automatic number identification (ANI), and caller ID value.

* * * * *